United States Patent
Stevens

(10) Patent No.: US 6,520,443 B2
(45) Date of Patent: *Feb. 18, 2003

(54) PRETENSIONER DRIVE

(75) Inventor: Bruce A. Stevens, Oakland Township, MI (US)

(73) Assignee: Automotive Systems Laboratory, Inc., Farmington Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/873,812

(22) Filed: Jun. 4, 2001

(65) Prior Publication Data

US 2002/0070306 A1 Jun. 13, 2002

Related U.S. Application Data

(63) Continuation-in-part of application No. 09/777,388, filed on Feb. 5, 2001, now Pat. No. 6,419,177.
(60) Provisional application No. 60/209,060, filed on Jun. 2, 2000.

(51) Int. Cl.[7] ............................................... B60R 22/46
(52) U.S. Cl. ...................................................... 242/374
(58) Field of Search .......................... 242/374; 280/806; 297/478, 480

(56) References Cited

U.S. PATENT DOCUMENTS

| | | | |
|---|---|---|---|
| 4,750,686 A | * 6/1988 | Fohl | 242/374 |
| 4,750,759 A | 6/1988 | Escaravage | 280/806 |
| 4,932,603 A | 6/1990 | Yamanoi et al. | |
| 5,190,239 A | * 3/1993 | Yoshida et al. | 242/374 |
| 5,222,994 A | 6/1993 | Hamaue | |
| 5,397,075 A | 3/1995 | Behr | 242/374 |
| 5,588,608 A | 12/1996 | Imai et al. | 242/374 |
| 5,641,131 A | 6/1997 | Schmid et al. | 242/374 |
| 5,697,571 A | 12/1997 | Dybro et al. | 242/374 |
| 5,839,686 A | 11/1998 | Dybro et al. | 242/374 |
| 5,853,135 A | 12/1998 | Dybro et al. | 242/374 |
| 5,899,399 A | 5/1999 | Brown et al. | 242/374 |
| 5,906,328 A | 5/1999 | Hamaue et al. | 242/374 |
| 5,944,350 A | 8/1999 | Grabowski et al. | 280/806 |
| 5,967,440 A | 10/1999 | Marshall | 242/374 |
| 6,000,655 A | 12/1999 | Coppo | 242/374 |
| 6,036,274 A | 3/2000 | Kohlndorfer et al. | 297/480 |
| 6,139,058 A | 10/2000 | Bohmler | 280/806 |

FOREIGN PATENT DOCUMENTS

| | | | | |
|---|---|---|---|---|
| DE | 32 31 509 A1 | 3/1984 | | |
| DE | 100 10 379 A1 | 9/2000 | ........... | B60R/22/46 |

* cited by examiner

Primary Examiner—John M. Jillions
(74) Attorney, Agent, or Firm—Dinnin & Dunn, P.C.

(57) ABSTRACT

A pretensioner 10 for a seat belt 12 employs a strap 30 fixed about a pulley 34 and also fixed at an opposite end 36 to a housing 18. Upon pretensioner activation, an actuator 20 is propelled across a rectangular passage 72 thereby impelling a portion 31 of the strap 30 extending across the passage 72. Torque created by the strap 30 about the pulley 34 effects slideable and rotary engagement of the geared pulley 34 with a geared hub 38. The geared hub 38 co-axially and rotatably communicates with a seat belt retractor spool 46 wherein a seat belt retractor spool shaft 40 axially extends through hub 38 and spool 46. Activation of the pretensioner 10 therefore results in ignition of a gas generant 22 that produces sufficient gas pressure to drive the actuator 20, thereby effecting rotary movement in the pulley 34, the hub 38, the shaft 40, and the spool 46. A seat belt 12 wound about the spool 46 is thereby pretensioned.

4 Claims, 3 Drawing Sheets

PRETENSIONER DRIVE

CROSS-REFERENCE TO RELATED APPLICATIONS

This application claims the benefit of U.S. Provisional Application Ser. No. 60/209,060 filed on Jun. 2, 2000. This application is also a continuation in part of U.S. application Ser. No. 09/777,388 filed on Feb. 5, 2001 now U.S. Pat. No. 6,419,177.

BACKGROUND OF THE INVENTION

The present invention relates to seat belt pretensioners and, more specifically, to a seat belt pretensioner that incorporates a plurality of simplified motion multipliers thereby reducing the actuator stroke requirement.

Seat belt pretensioners remove slack from a seat belt in the event of a collision in order to minimize forward movement of the passenger. While it is known to use pyrotechnic gas generators to operate mechanisms which wind up or otherwise pull in slack in the seat belt during a collision, such known pyrotechnic gas generators are generally disposed internally of a seat belt retractor. Thus, the vehicle owner is faced with a significant cost penalty in that the entire pretensioner and retractor assembly must be replaced after activation because of the inability to prevent degradation of the retractor. High-temperature gases tend to abrade interior metal surfaces and produce ash and clinkers that bind up the retraction mechanism.

Another problem with known pretensioners is that they are designed to activate only in severe accidents, for example, accidents that exhibit "G" forces sufficient to activate the vehicle airbags. Safety system designers generally choose such a relatively high activation threshold due to the expense of replacing the entire seat belt retractor and pretensioner assembly after activation. As a result, seat belt pretensioners do not protect passengers in less severe accidents.

A related problem with known pretensioners is that when the pretensioner is activated only in severe accidents, activation is relatively late in the crash sequence. Thus, the pretensioner must rapidly take up slack in the seat belt, sometimes injuring the passenger.

U.S. Pat. No. 5,967,440, herein incorporated by reference, describes a pretensioner and a conventional retractor for a safety belt system. When compared to the seatbelt retractor, the pretensioner is relatively complex and large, thus increasing the weight and spatial requirements of the seatbelt assembly.

U.S. Pat. No. 5,899,399, herein incorporated by reference, describes a state of the art pretensioner. The pretensioner is relatively complex and as such complicates the manufacturing process.

U.S. Pat. No. 5,944,350, herein incorporated by reference, describes a state of the art pretensioner. Again, the pretensioner is relatively large, thus increasing the weight and spatial requirements of the seatbelt assembly.

German Patent No. DE 10010379 A1, herein incorporated by reference, describes a pretensioner having an arcuate path for a multi-piece actuator (a plurality of cylinders) that drives a steel cord wrapped around a webbing reel hub and thereby effects pretensioning of an associated seat belt. The manufacturing of the pretensioner is more complex given the multi-piece actuator and given the arcuate channel that the actuator must traverse. Uniformity in channel width and effective sealing becomes more difficult with the use of an arcuate channel. Secondly, a noise reduction means is employed to prevent rattling during normal vehicle operation, thereby increasing manufacturing costs. Furthermore, the joint use of the multi-piece actuator with the steel cord results in a friction loss and a reduction in the load applied to the steel cord by the forward-most cylinder of the actuator. As a result, more force is required to drive the multi-piece actuator and pretension the seatbelt. One solution is described by the use of an intermediate element "43" for facilitating the smooth movement of the rotating elements along the arcuate channel. Consequently, without the use of the intermediate element "43", a more robust pretensioner housing would be necessitated to withstand the relatively greater combustion pressure (produced by a greater amount of propellant) likely necessary to pretension the seatbelt in accordance with customer requirements.

Other pretensioner designs employ relatively complicated clutch assemblies for clutching a seat belt retractor axle associated therewith. Many known pretensioner drive systems are also relatively complex. U.S. Pat. Nos. 6,042,041, 5,842,344, 5,794,876, and 5,699,976, herein incorporated by reference, illustrate the complexity of known pretensioners. Simplification of known designs, therefore, is desirable given a resultant simplification of manufacturing requirements.

SUMMARY OF THE INVENTION

The aforesaid problems are solved, in accordance with a preferred constructed embodiment of the present invention, by a seat belt pretensioner that utilizes a plurality of motion multipliers within an essentially sealed housing thereby preventing retractor exposure to combustion gases and clinkers. More specifically, the present invention utilizes a drive gear that slideably engages a geared hub thereby pretensioning a seat belt without the need for a clutch. The present design also prevents occupant exposure to the gases and solids formed upon combustion of a pyrotechnic composition contained within the pretensioner.

In the preferred embodiment of the invention, the pretensioner contains a housing, a slideable one-piece drive gear communicating with a geared hub, a retractor shaft axially and longitudinally disposed within a geared hub, a strap that communicates with the drive gear upon pretensioner activation, a piston that communicates with the strap upon pretensioner activation, a gas generant or pyrotechnic that propels the piston, and an initiator that ignites the gas generant upon a signal from an accelerometer, for example. Upon ignition of the gas producing pyrotechnic, the piston is driven forward in an essentially linear path thereby tightening the strap and rotating the drive gear, and simultaneously biasing the drive gear to slideably engage with the geared hub. Rotation of the geared hub fixed over a first end of the webbing reel shaft thus effects pretensioning of a seat belt spooled about a webbing reel fixed about a second end of the retractor shaft.

After use, only the pretensioner or parts therein need be replaced, obviating the expense of also replacing the retractor or other components of the seat belt retraction mechanism. In general, the retractor is preserved for future use.

Because expense heretofore associated with activation of a pretensioner is significantly reduced, passengers can be given the protection of seat belt pretensioning in even minor accidents. Moreover, a pretensioner that activates in minor collisions will also activate earlier in a severe crash sequence. Earlier activation of the pretensioner permits the pretensioner to operate less aggressively, reducing the possibility of injury caused by the seat belt pretensioner itself.

BRIEF DESCRIPTION OF THE DRAWINGS

FIG. 5 is an embodiment indicating placement of the gas generant composition within the actuator.

DESCRIPTION OF THE PREFERRED EMBODIMENT

Figure 1:
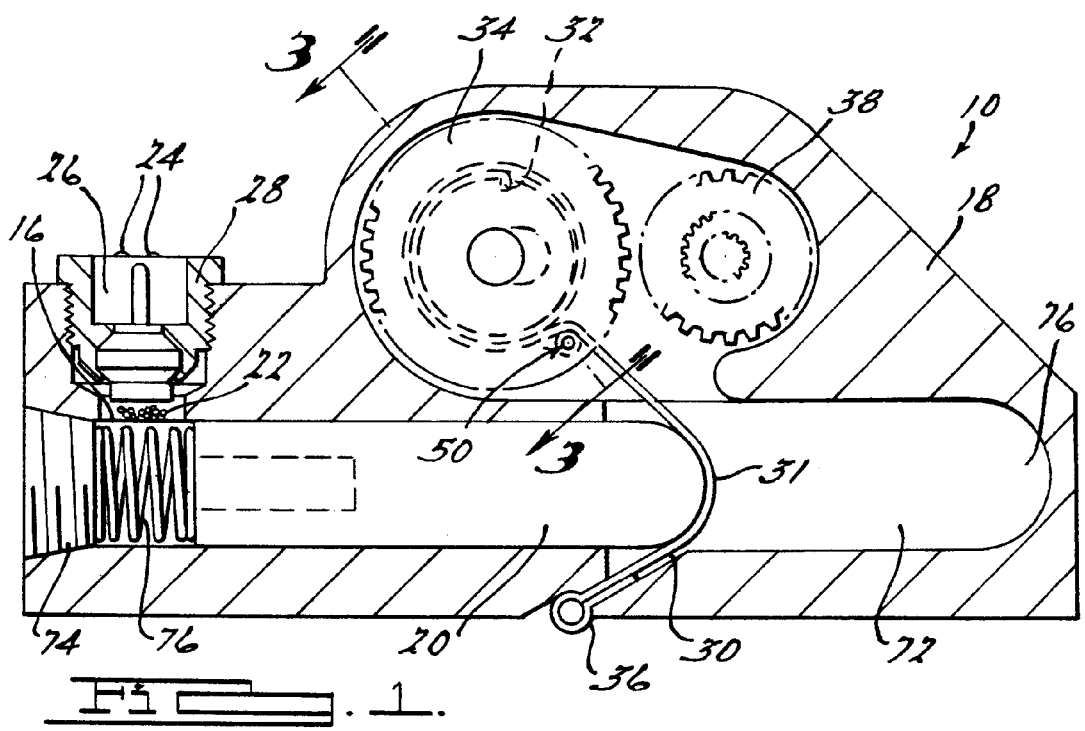
FIG. 1 is a diagrammatic elevational view of a replaceable seat belt pretensioner prior to activation, in accordance with the present invention.
Figure 2:
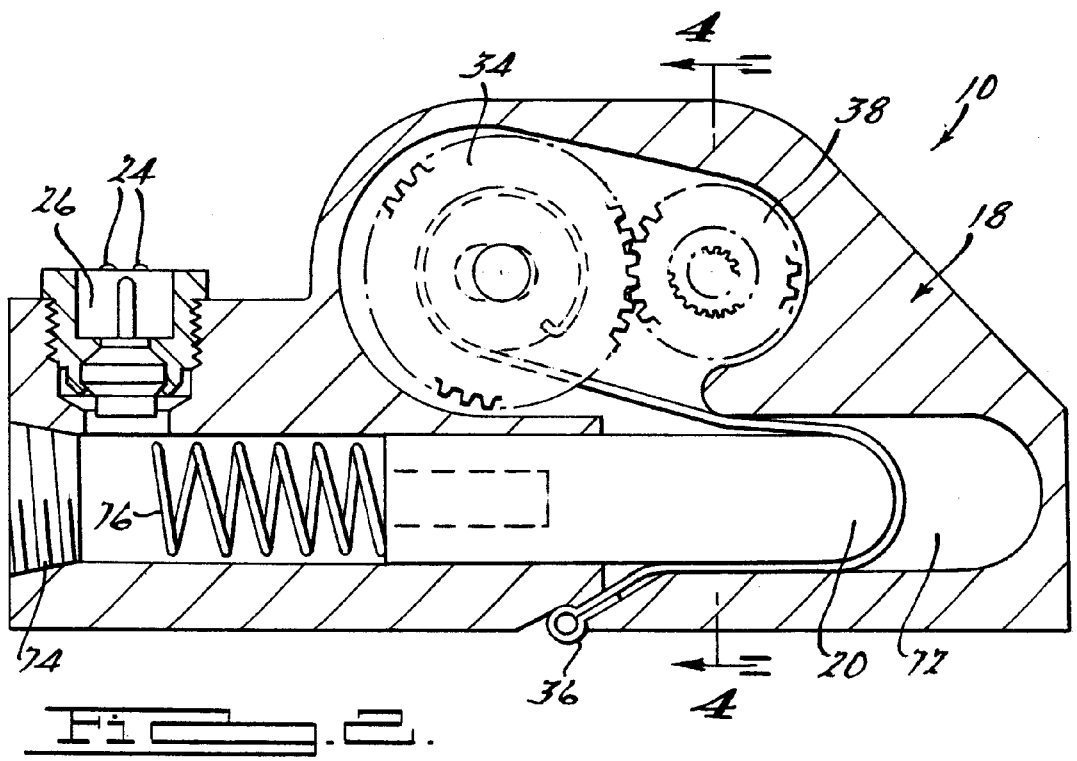
FIG. 2 is a diagrammatic elevational view of the replaceable seat belt pretensioner after activation, in accordance with the present invention.

Referring to the figures, a pretensioner 10 in accordance with a preferred embodiment of the invention, comprises a gas generator 16 employed to pretension a seat belt 12 of a conventional seat belt retractor 14. Typical seat belt retractors, to which the pretensioner of the present invention has application, are taught in U.S. Pat. Nos. 5,743,480, 5,553,803, 5,667,161, 5,451,008, 4,558,832 and 4,597,546, herein incorporated by reference. It should be emphasized, however, that although many known retractors employ clutch mechanisms upon pretensioner activation, the present invention obviates the need for clutch assemblies used to pretension the seat belt. Manufacturing of retractors associated with a pretensioner of the present invention may therefore be simplified.

A housing 18 contains the gas generator 16. The gas generator 16 fluidly communicates with a piston 20 upon combustion. The piston 20 is made from steel, brass, aluminum, plastic, or other sufficiently rigid material. The gas generator 16 contains a pyrotechnic material 22 that when combusted is used to actuate the pretensioner 10. The gas generant composition 22 may be any known pretensioner gas generant compound or alternatively, it may be any known gas generant useful in airbags, for example. To illustrate, see U.S. Pat. No. 5,035,757 herein incorporated by reference. Alternatively, as shown in FIG. 5, the gas generant 22 may be contained within the piston 20 thereby eliminating the need for a separate generator 16.

Electrical contacts 24 on an initiator 26 communicate with a crash event sensor (not shown) that signals actuation of the pretensioner 10 upon a vehicle collision. Once the initiator 26 receives a signal, from an accelerometer for example, it ignites the pyrotechnic gas generant 22. An initiator retainer 28 is threadedly or otherwise received within the housing 18 and houses the initiator 26. Stated another way, a means for activating the pretensioner 10 and driving the actuator 20 upon a crash event includes the gas generant 22 contained within the piston 20 (or provided in a separate gas generator 16), the electrical contacts 24, and the initiator 26.

Gas produced from combustion of the pyrotechnic gas generant 22 then propels the piston 20 into a flat portion 31 of a strap 30. The strap 30 is spooled and anchored at a first end 32 around a sliding one-piece drive gear or pulley 34. A second end 36 of the strap 30 is secured to the exterior of housing 18 at a point adjacent or proximate to the piston 20. Drive gear 34 slideably engages a geared hub 38 upon actuation of the piston 18. During normal operation of the vehicle and prior to pretensioner activation, the drive gear 34 and the second gear or geared hub 38 are juxtaposed but not engaged. Once the pretensioner 10 is activated, however, the torque exerted by strap 30 snaps the shear pin 50, and gear 34 then slideably engages geared hub 38. A webbing reel shaft 40 of the retractor 14 is axially and longitudinally disposed and press-fitted or otherwise fixed to the hub 38 about a first end 42 of the shaft 40. A second end 44 of retractor axle 40 extends through the housing 18 and into the retractor 14. A webbing spool or reel 46 rotates about the second end 44 for winding and unwinding of the seat belt 12.

As shown in the Figures, a shear pin 50 extends through an inner wall 52 and an outer wall 54 of the pulley 34. Or, stated another way, the shear pin 50 longitudinally extends through pulley 34 and fixes the pulley 34 to the housing 12 and to a cover 56 thereby preventing linear and rotary motion of the geared pulley 34 prior to pretensioner activation. An axial cylinder or cylindrical portion of 58 of pulley 34 accepts coiled or circumferential disposition of the strap 30 fixed thereto. Upon pretensioner activation and actuation of the piston 20, the strap 30 exerts a torque about the cylinder 58 of the pulley 34. As the torque increases responsive to movement of actuator 20, shear pin 50 is sheared at portions 60 each having a relatively smaller diameter than a middle portion 62, thereby permitting linear movement and engagement of gear 34 with gear 38.

Figure 3:
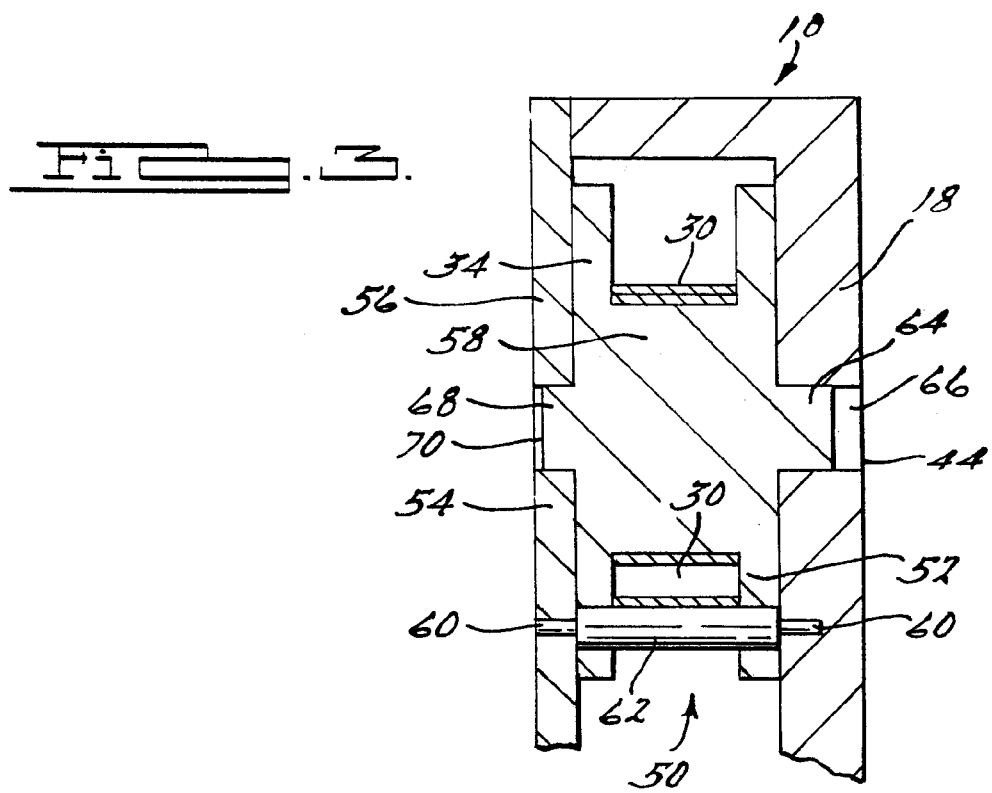
FIG. 3 is a cross-sectional view of the embodiment in FIG. 1 taken along the line A—A.
Figure 4:
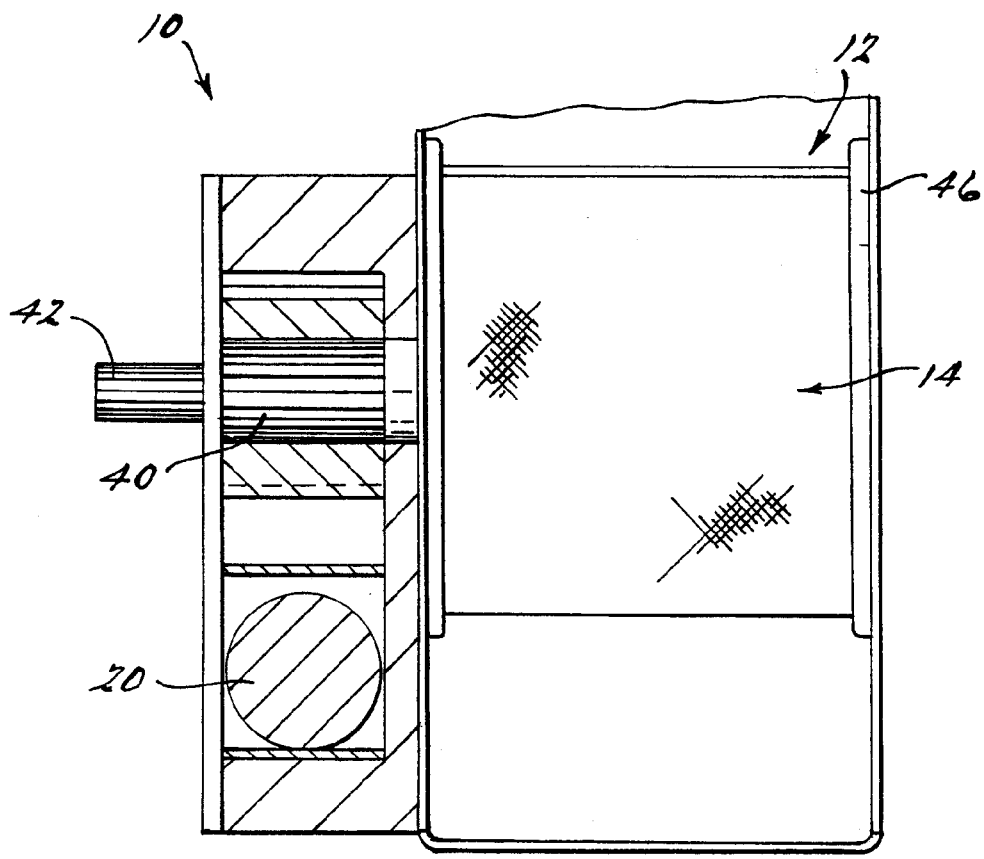
FIG. 4 is a cross-sectional view of the embodiment in FIG. 2 taken along the line B—B, and illustrates the mechanical cooperation between a pretensioner of the present invention and a state-of-the-art seat belt retractor.
Figure 3:
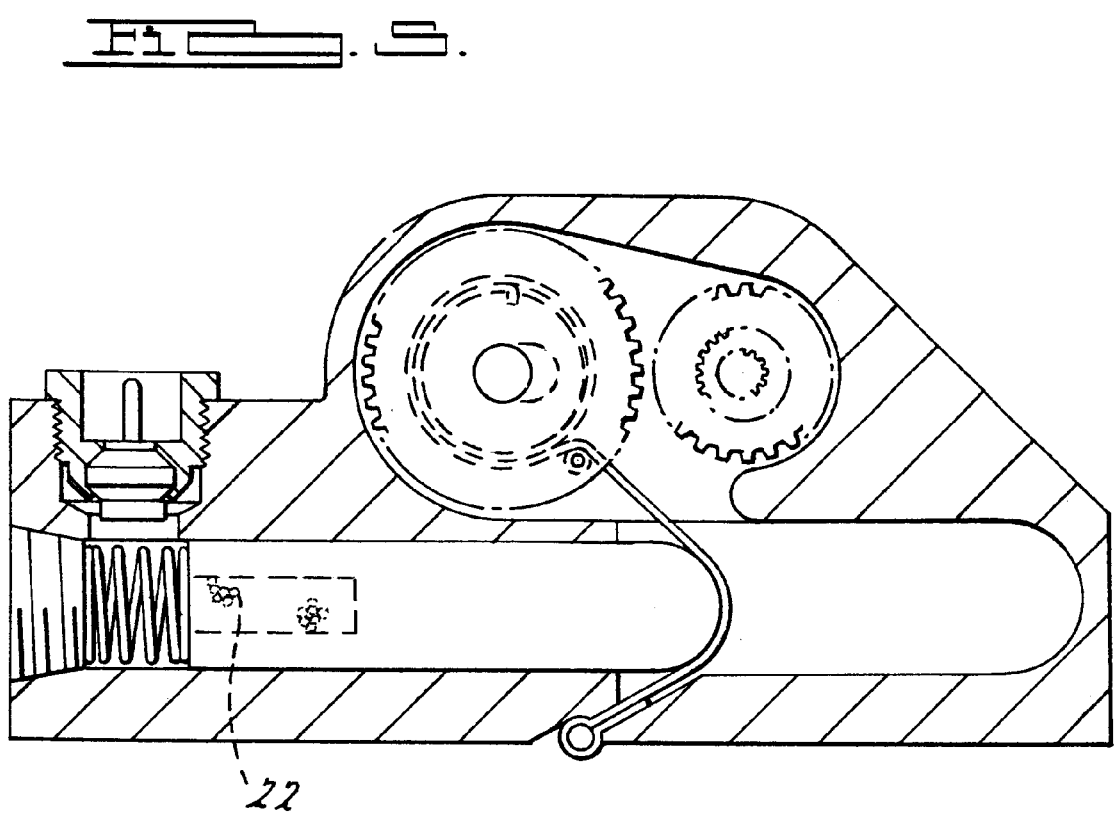

As also shown in FIG. 3, the geared pulley 34 further comprises a first stub shaft 64 interfaced with a first guide slot 66 formed in the housing 18. Gear 34 also contains a second stub shaft 68 co-axially oriented with the first stub shaft 64 wherein the shaft 68 interfaces with a second guide slot 70 formed in the cover 56. Torsion created by the strap 30 facilitates linear movement of the drive gear 34 by corresponding linear movement of each stub shaft across its respective slot. In addition to guiding the drive gear 34, the stubs and respective slots provide bearing surfaces to minimize friction losses as well as establishing drive gear 34-to-hub 38 center distance.

In yet another aspect of the invention, a first rectangular channel 72 has a first end 74 and a second end 76, and is formed longitudinally and substantially coextensive with the housing 18. The actuator 20 is housed within the first end 74 prior to ignition of the propellant 22 and pretensioner 10 activation. A spring 76 may be employed to bias a leading edge of the actuator 20 against the flat portion 31 of the strap 30 that crosses the passage 72. Noise due to vibration is thereby inhibited. The first end 32 of the strap 30 extends from portion 31 and is spooled about the cylindrical portion 58 of the pulley 34. The second end 36 of strap 30 is fixed to the exterior of the housing 18 adjacent the piston 20. When arranged in this manner, the strap 30 provides a motion multiplier effect comparable to that afforded by the use of geared motion multipliers such as planetary gears, but at a much lower cost. In sum, linear motion of the actuator 20 translates to linear and rotary motions of the drive gear 34, rotary motion of the geared hub 38, and rotary motion of the spool 46 in co-axial relation with the hub 38. The seat belt 12 is thus tightened.

In essence, the present invention incorporates three separate, but simple, motion multiplying features: 1) the piston 20/strap 30 arrangement; 2) the two diameter one-piece slideable drive gear 34 (a smaller input diameter of cylinder 58 vs. a larger relative output diameter of inner wall 52 and outer wall 54, wherein the input diameter or cylinder 58 has the strap 30 coiled about it and the output diameter or geared walls 52 and 54 mesh with the hub gear 38 upon pretensioner 10 activation); and 3) larger drive gear 34 diameter (output diameter of geared walls 52 and 54) vs. a relatively smaller hub gear 38 diameter. Additionally, the present invention simplifies the design and manufacturing of known motion multipliers incorporating clutch mechanisms. A clutch is simply not required in accordance with the present invention. Finally, an essentially sealed housing 18 prevents the release of relatively large quantities of gas, noise, and flame.

To illustrate a retractor response based on pretensioner operation, see U.S. Pat. No. 5,899,399 to Brown et al., herein incorporated by reference. "Pretensioning" is generally defined to mean to take up slack in the seat belt. In accordance with the present invention, the gas produced by the gas generant propels the piston 20 into the strap 30 and thus affects rotary advancement of the hub 38 thereby tightening the slack in the seat belt 12.

The housing 18, the piston 20, the drive gear 34, the hub gear 38, and the initiator retainer 28 are preferably injection-molded, die cast, impacted, and/or machined from plastics, composites, and/or one or more metals such as steel, a steel alloy, zinc, or aluminum. The gas generator 16, the gas generant 22, the initiator 26 and the strap 30 are all manufactured or obtained by methods known to those of ordinary skill. Strap 30, for example, may be formed from steel or aluminum strip, steel or aluminum cable, or fabric (cloth or rubber) strip. Companies such as Takata, Inc. of Japan may supply the gas generator 16. The initiator 26 may be supplied by the original equipment manufacturer or from companies such as Special Devices Incorporated. The aforementioned references are incorporated by reference and cited by way of example.

Resultant benefits include simplified manufacturing and retractor preservation. For example, see U.S. Pat. No. 5,899,399 to Brown et al. Also see U.S. Pat. No. 5,397,075 to Behr, herein incorporated by reference, wherein gear driving mechanisms used to actuate the retractor axle can be replaced by the present invention. Finally, gas ventilation ports as described in the cited references are not required (but may be provided if desired) and therefore manufacturing is even further simplified.

While the foregoing illustrates and describes the use of the present invention, it is not intended to limit the invention as disclosed in certain preferred embodiments herein. Therefore, variations and modifications commensurate with the above teachings and the skill and/or knowledge of the relevant art, are within the scope of the present invention as described herein and as stated in the appended claims.

I claim:

1. A pretensioner cooperating with a webbing reel shaft of a seatbelt retractor webbing reel, that upon activation pretensions seatbelt webbing wound about the reel, the pretensioner comprising:

a housing having a first rectangular passage longitudinally extending within said housing, the passage having a first end and a second end;

a geared hub rotatably communicating with and fixed to said webbing reel shaft wherein said shaft axially extends from the reel through the housing and axially through said first gear;

a geared pulley slideably engageable with said geared hub upon pretensioner activation, but disengaged with the hub prior to pretensioner activation;

a strap comprising a first end fixed to said housing, an intermediate portion extending from said first end and across said first passage, and a second end extending from said intermediate portion and spooled about and fixed to said pulley;

an actuator positioned within the first end of said passage for tensioning said strap upon pretensioner activation;

a gas generant composition, ignitable to activate the pretensioner and release sufficient force to drive the actuator through said second passage; and an initiator contained within said housing and ignitably communicating with said gas generant composition for igniting said gas generant composition, whereby upon ignition of said gas generant and upon actuator motion, tensioning of the strap is thereby effected, resulting in rotary advancement of the pulley, the hub, the webbing reel shaft, and the webbing reel, thereby winding the reel and tensioning the seatbelt webbing thereon.

2. The pretensioner of claim 1 wherein said actuator contains a gas generant composition that upon ignition propels the actuator.

3. The pretensioner of claim 1 further comprising a gas generator for containment of the gas generant composition wherein said gas generator fluidly communicates with said actuator upon pretensioner activation.

4. A pretensioner cooperating with a webbing reel shaft of a seatbelt retractor webbing reel, that upon activation pretensions seatbelt webbing wound about the reel, the pretensioner comprising a housing having a first rectangular passage longitudinally extending within said housing, the passage having a first end and a second end;

a geared hub rotatably communicating with and fixed to said webbing reel shaft wherein said shaft axially extends from the reel through the housing and axially through said first gear;

a geared pulley slideably engageable with said geared hub upon pretensioner activation, but disengaged with the hub prior to pretensioner activation;

a strap comprising a first end fixed to said housing, an intermediate portion extending from said first end and across said first passage, and a second end extending from said intermediate portion and spooled about and fixed to said pulley;

an actuator positioned within the first end of said passage for tensioning said strap upon pretensioner activation; and a means for activating the pretensioner and driving the actuator through the passage, whereby upon activation of the pretensioner, the strap translates linear motion of the actuator to rotary movement of the pulley, the hub, and the spool in coaxial communication with the hub, and thereby pretensions the seatbelt.

* * * * *